United States Patent
Hillerson

(10) Patent No.: US 6,196,474 B1
(45) Date of Patent: Mar. 6, 2001

(54) PRESSURIZED CYCLIST WATER SPRAYING APPARATUS

(76) Inventor: Michael Hillerson, 210 Quaint Acres Dr., Silver Spring, MD (US) 20904

( * ) Notice: Subject to any disclaimer, the term of this patent is extended or adjusted under 35 U.S.C. 154(b) by 0 days.

(21) Appl. No.: 09/421,326

(22) Filed: Oct. 18, 1999

(51) Int. Cl.[7] .............. B05B 9/06; B05B 15/06
(52) U.S. Cl. .......... 239/289; 239/373; 222/608; 310/65 C; 280/288.4
(58) Field of Search .................. 222/628, 627, 222/608; 239/289, 337, 373, 152, 154; 280/288.4, 304.2; 310/75 C

(56) References Cited

U.S. PATENT DOCUMENTS

| | | | |
|---|---|---|---|
| 567,719 | * | 9/1896 | Libbey .............................. 310/75 C |
| 645,482 | * | 3/1900 | Mills ................................. 288/304.2 |
| 2,416,833 | * | 3/1947 | Katcher et al. ................... 310/75 C |
| 3,677,446 | * | 7/1972 | Guyer, Jr. et al. . |
| 4,807,813 | * | 2/1989 | Coleman ......................... 239/289 X |
| 4,815,635 | * | 3/1989 | Porter ............................ 280/288.4 X |
| 4,911,339 | * | 3/1990 | Cushing ......................... 222/608 X |
| 5,158,218 | * | 10/1992 | Wery .............................. 280/288.4 X |
| 5,201,442 | * | 4/1993 | Bakalian ......................... 222/608 X |
| 5,461,269 | * | 10/1995 | De Raucourt ...................... 310/75 C |
| 5,645,404 | * | 7/1997 | Zelenak . |
| 5,735,440 | * | 4/1998 | Regalbuto ........................ 222/628 X |
| 5,895,991 | * | 4/1999 | Butz ................................. 310/75 C |

* cited by examiner

Primary Examiner—Lesley D. Morris
(74) Attorney, Agent, or Firm—Oblon, Spivak, McClelland, Maier & Neustadt, P.C.

(57) ABSTRACT

A pressurized cycling water spraying apparatus adapted to be mounted on a cycling device having at least one rotating wheel. The apparatus includes a reservoir having an interior adapted to contain a fluid, an electric generator adapted to generate electric power from the rotation of the wheel, and an electric pump powered by the electric generator and adapted to pressurize the interior of the reservoir by a flow of air from the pump through an air tube and into the reservoir. Pressurized fluid is conveyed from the reservoir through a first tube to a fluid valve adapted to block or pass the pressurized fluid. With the valve in an open position, fluid is further conveyed through a second fluid tube to a spray nozzle adapted to provide a stream of fluid to the rider of the cycling device.

12 Claims, 1 Drawing Sheet

PRESSURIZED CYCLIST WATER SPRAYING APPARATUS

BACKGROUND OF THE INVENTION

1. Field of the Invention

This invention generally concerns a pressurized cyclist water spraying apparatus. The invention more particularly concerns a pressurized cyclist water spraying apparatus which attaches to a bicycle or exercise machine for controllably providing a cool spray of water over the rider.

2. Discussion of the Background

It is often desirable and/or necessary during strenuous activities such as cycling to assist the body's cooling by applying water to the surface of the skin. This is particularly true in hot dry environments and where the strenuous activity is sustained for a significant period of time.

U.S. Pat. No. 4,815,635 to Porter and U.S. Pat. No. 4,911,339 to Cushing, for example, disclose a bicycle mounted portable container having a pump which the rider manually operates to receive a spray of water. However, such manually operated devices pose a potential safety hazard in that the user's hand and attention are occupied during operation of the bicycle.

To solve this problem, automatic pump devices are also known such as that disclosed in U.S. Pat. No. 5,645,404 to Zelenak where an electric pump is used for supplying fluids from a reservoir to the user. However, this device requires batteries which are generally heavy, bulky items which are undesirable for cycling apparatus. Moreover, batteries may run out at inconvenient times during a cycling ride and require frequent replacement which is expensive.

Yet another type of device is disclosed in U.S. Pat. No. 4,807,813 to Coleman and U.S. Pat. No. 3,677,446 to Guyer, Jr., et al. which disclose bicycle mounted water toys that include a fluid pump driven by a rotating wheel of the bicycle to remove water from a reservoir and convey the water to the water toy. However, the fluid pump of these devices provides a stream of fluid on demand which generally requires a large and heavy pump structure which, again, is undesirable for cycling apparatus.

Thus, there is a need for a fluid dispensing system for automatically dispensing a controlled stream of fluid to the user of a bicycle or exercise equipment, and which utilizes a light and simple pump structure that operates without batteries and requires relatively little power.

SUMMARY OF THE INVENTION

It is an object of the current invention to provide a fluid dispensing system for automatically dispensing a controlled stream of fluid to the user of a bicycle or exercise equipment, and which utilizes a light and simple pump structure that operates without batteries and requires relatively little power.

In one form of the invention a pressurized cyclist water spraying apparatus adapted to be mounted on a cycling device having at least one rotating wheel is provided. The apparatus includes a reservoir having an interior adapted to contain a fluid, an electric pump powered by an electric generator having a generator friction wheel engagable with the rotating wheel of the cycling device wherein the rotating wheel turns the generator friction wheel to generate electrical power for the electric pump. The pump is adapted to pressurize the interior of the reservoir, and a fluid valve is adapted to block or pass a stream of pressurized fluid from the reservoir to the spray nozzle and onto the rider of the cycling device. The pump and reservoir are connected via a first tube adapted to convey air from the pump into the reservoir, and the reservoir and spray nozzle are connected via the fluid valve, by a second and third fluid tube each adapted to convey fluid from the reservoir to the spray nozzle.

In another embodiment of the present invention, an electric fan also powered by the generator is provided. In this embodiment, an electric switch adapted to control the flow of power to electric fan is also provided.

In yet another embodiment of the present invention, a pressure valve is attached to the reservoir and adapted to release pressure from the reservoir at a predetermined pressure level such that the pressure in the reservoir is maintained at a constant level.

In still another embodiment of the present invention, an on/off mechanism is provided to control the flow of electric current from the generator to the electric pump. The on/off mechanism may be a conventional electric switch, or a mechanical lever which causes the generator friction wheel to engage and disengage the drive wheel of the cycling device.

Thus, Applicant's invention provides a fluid dispensing system for automatically dispensing a stream of fluid to the user of a bicycle or exercise equipment, and which utilizes a light and simple pump structure that operates without batteries and requires relatively little power per unit time.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein.

DESCRIPTION OF THE PREFERRED EMBODIMENTS

Figure 1:
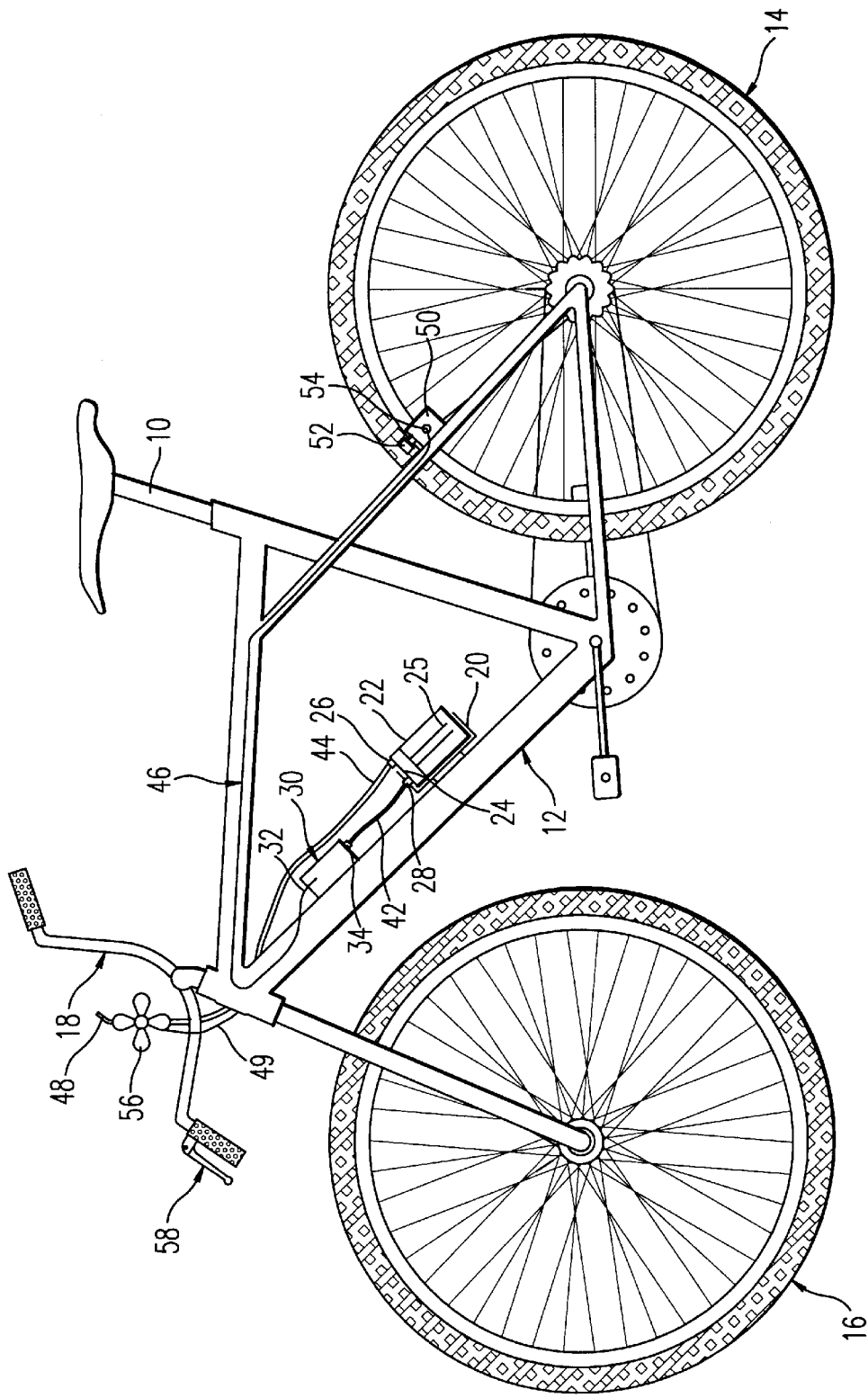
FIG. 1 is a perspective view of a bicycle with the pressurized cyclist water spraying apparatus mounted thereon.

Referring now to the drawing, there is illustrated a pressurized water bottle and sprayer apparatus of the present invention, generally designated by the reference numeral 1, which automatically dispenses a controlled stream of fluid to the user of a bicycle or exercise equipment, and which utilizes a light and simple pump structure that operates without batteries and requires relatively little power. The device is mounted to a bicycle 10 which includes a support frame 12, a drive wheel 14, a steering wheel 16, and a handlebar 18.

The pressurized cyclist water spraying apparatus 1 generally includes a fluid reservoir 20, an electric pressure pump 30, an electric generator 50, a generator wire 46 connecting the generator 50 to the pump 30, an air tube 42 connecting the pump 30 to the reservoir 20, and fluid tubes 44 and 45 connecting the reservoir 20 to a spray nozzle 48 via a fluid valve 58.

The fluid reservoir 20 may be mounted anywhere on the frame 12 which is convenient and is preferably releasably mounted to the frame 12 using any suitable bracket or clamp (not shown). In the embodiment of FIG. 1 the reservoir 20 is mounted on the middle portion of the frame 12. The reservoir 20 has a bottle portion 22 for holding a volume of fluid, and a lid 24 which releasably engages an opening in the bottle portion 22 to contain a volume of fluid in the reservoir 20. The lid 24 can have any suitable sealing means such as a mating threaded surface which provides a substantially air tight seal when engaged with the bottle portion 22. The lid 24 includes an air inlet port 28 and a fluid outlet port 26. The outlet port preferably includes a tubular portion 25 that extends to the bottom of the reservoir when the lid 24 is engaged with the bottle 22. Alternatively, the outlet port may comprise an orifice for sealably receiving a fluid tube which is inserted into the orifice and extended to the bottom of the reservoir 20.

Releasably attached to the fluid outlet port 26 is a flexible fluid tube 44 for carrying fluid away from the reservoir 20. The fluid tube 44 is preferably made of a flexible polymer material and runs along and is fastened to the frame 12 of the bicycle 10 and terminates at a fluid valve 58 which is preferably mounted to the handlebar 18. Also attached to the fluid valve 58 is spray fluid tube 45 preferably made of material similar to fluid tube 44, and terminating at a distal end to which a spray nozzle 48 is attached. The spray nozzle 48 may be an integral part of the spray fluid tube 45 or a separate piece attached to the spray fluid tube 45 by any suitable means for attaching. The spray nozzle 48 may have a single orifice to provide a stream of fluid to the rider, or preferably is divided into a series of smaller orifices to deliver a more dispersed stream of fluid to the rider. The spray nozzle 48 and fluid valve 58 of FIG. 1 are mounted to the handlebar 18 by any suitable clamping means (not shown), but may be mounted in any convenient location on the bicycle 10.

The fluid reservoir 20 is pressurized by electric pump 30. The electric pump 30 has an electrical pump contact 32 and an air outlet valve 34. Attached to the air outlet valve 34 is a flexible air tube 42 which runs along the frame 12 and is releasably attached to the air inlet port 28 of the reservoir 20.

Supplying electric power to the pressure pump 30 is an electric generator 50 which generates electricity by rotation of the drive wheel 14. The electric generator 50 is mounted to a rear portion of frame 12 adjacent to the drive wheel 14 and includes a friction wheel 52 which engages the drive wheel 14, and an electrical generator contact 54. The generator friction wheel 52 is preferably biased into engagement with the drive wheel 14 by any known spring biasing means (not shown) and may be continuously biased or releasably biased into engagement with the drive wheel 14. While the generator 50 is shown adjacent to the drive wheel 14 in FIG. 1 for illustrative purposes, it is contemplated that the generator 50 may be mounted on a front portion of the frame 12 such that the friction wheel 52 is biased towards the steering wheel 16 of the bicycle 10. A generator wire 46 is attached to the generator contact 54 and is fastened to and runs along the frame 12 until terminating at the pump contact 32 of pump 30. Electrical ground for the circuit is provided by the frame 12 (otherwise an additional return wire will be necessary). The generator 50 may also supply power, via a fan wire 49, to a fan 56 optionally mounted on the handlebar 18.

Operation of the pressurized water bottle system 1 will now be discussed. To fill the reservoir 20 with water, the air tube 42 and the water tube 44 are removed from the lid 24. The reservoir 20 is then removed from the frame 12, filled with water, re-mounted on the frame 12, and the air hose 42 and water hose 44 are re-attached to their respective valves on the lid 24. Alternatively, lid 24 may remain attached to tubes 42 and 44 while bottle portion 22 is unscrewed from lid 24 and removed from the frame 12 for filling.

In the embodiment shown in FIG. 1, the electric generator 50 is mounted on a rear portion of the frame 12 such that the friction wheel 52 is continuously biased into engagement with the drive wheel 14. When the bicycle 10 is in motion, rotation of the drive wheel 14 causes the generator friction wheel 52 to turn and generate electric power in a known manner for use in operating the electric pump 30. Electric power is transferred via generator contact 54 through generator wire 46 to pump contact 32. With power applied to the electric pump 30, the pump generates a flow of air in a known manner which is conveyed out of the outlet port 34, through the air tube 42, and into the air inlet valve 28 of the reservoir 20. As air flows into the reservoir 20, air pressure causes a column of water to move from the reservoir 20 through the water tube 44 to the fluid valve 58. With the fluid valve 58 in a closed position, water cannot flow from the reservoir 20, and pressure gradually builds in the reservoir 20. With the fluid valve 58 in an open position, any pressure buildup in the reservoir 20 is released as a stream of pressurized fluid conveying from the reservoir 20, through the fluid tubes 44 and 45, to the spray nozzle 48 to cause a spray of water on the rider of the bicycle 10.

In this embodiment, as the air flow from the pump 50 to the reservoir 20 is continuous and the fluid valve 58 allows pressure to build up in the reservoir 20, a small air flow rate from the pump to the reservoir may be used. Moreover, since the diameter of the fluid tube 44 is relatively small compared to the volume of the reservoir 20, a small amount of pressure in the reservoir 20 provided by the pump 30 translates to a large force pushing the column of water through the water tube 44. For these reasons, the pump 30 may be lightweight and small in structure and still produce the amount of air flow to the reservoir 20 that is necessary to cause water to be sprayed from the spray nozzle 48 onto the rider. Similarly, the electric power required to operate such a small capacity pump is mninimal and therefore the generator 50 may be small, lightweight, and present only a small load to the drive wheel 14. This embodiment presents an advantage in that a small amount of electric power and thus air flow can be continuously generated and stored in the reservoir 20 in the form of pressure buildup. As the typical cyclist desires only intermittent sprays of water from the spray nozzle 48, the pressure buildup may be released intermittently by opening the fluid valve 58, while pressure is replenished when the fluid valve 58 is closed. This utilization of pressure buildup allows use of a low capacity generator and pump are of a small size and light weight which is desirable for cycling apparatus.

The pressurized water bottle and sprayer system of the present invention may optionally include an electric fan 56 for cooling the user. While the fan is shown on the bicycle 10 in FIG. 1 for illustrative purposes, the fan is best suited for use on stationary exercise equipment having a rotating wheel. Electric power for the fan is generated by the electric generator 50 and transferred to the fan 56 via a fan wire in a manner already described. Preferably an electric switch (not shown) is provided disposed between the generator and fan to allow the rider to control the flow of electric power from the generator to the fan. The fan is preferably positioned in close proximity to the sprayer nozzle 48 such that air flow generated from the fan 56 will direct the spray of water toward the user of the equipment.

In another embodiment of the present invention, a pressure valve of any known type is preferably located on the reservoir 20, pump 30, or air tube 42 to release pressure from the reservoir at a predetermined level and prevent the reservoir 20 from becoming over pressurized.

In yet another embodiment of the present invention, pressurization of the reservoir 20 may be manually controlled by an on/off mechanism which controls the flow of electric power from the generator 50 to the electric pump 30. In one form of this embodiment, the on/off mechanism consists of a conventional electric switch disposed in series between the electric generator 50 and the electric pump 30. In a system including the fan 56, the electric switch of this embodiment may control the flow of electric power to both the electric fan 56 and the electric pump 30. The flow of electric power to the fan 56 is preferably controlled independently of the flow of electric power to the pump 30, however, an electric switch which provides common control through a single switch contact is contemplated.

Alternatively, the on/off mechanism consists of a mechanical lever which causes the generator friction wheel 52, releasably engaged to the drive wheel 14, to be biased into and out of engagement with the drive wheel 14. The mechanical lever (not shown) may be any suitable lever type and is preferably mounted on the handlebar 18 at a convenient location. A flexible cable attached to the lever preferably runs along and is fastened to the frame 12, and terminates in a connection with the spring biased generator friction wheel 52. With the mechanical lever in the "on" position, tension is removed from the cable and the spring biased generator friction wheel 52 moves into engagement with the drive wheel 14 to generate electric power which is used to pressurize the reservoir 20 in a manner already described. Once the reservoir is pressurized, the rider moves the lever to the "off" position, and tension on the cable moves the generator friction wheel 52 out of engagement with the drive wheel 14. In this position, no electric power is generated to power the electric pump 50 and therefore no air is conveyed to the reservoir 20. The reservoir 20 remains pressurized until the fluid valve 58 is opened and the rider gets a stream of water. This mechanical lever presents the further advantage in that the rider may remove the load of the generator friction wheel 52 from the drive wheel 14 when the reservoir 20 is adequately pressurized.

Obviously, numerous modifications and variations of the present invention are possible in light of the above teachings. It is therefore to be understood that within the scope of the appended claims, the invention may be practiced otherwise than as specifically described herein.

What is claimed as new and described to be secured by Letters Patent of the United States:

1. A pressurized cycling water spraying apparatus adapted to be mounted on a cycling device having at least one rotating wheel, said apparatus comprising:
   a reservoir having an interior adapted to contain a fluid;
   an electric generator adapted to generate electric power from said rotation of said wheel;
   an electric pump adapted to provide a low volume flow of air to said interior of said reservoir to gradually pressurize said interior of said reservoir to a pressure level sufficient to spray water from said reservoir, said pump being powered by said electric generator;
   a spray nozzle adapted to provide a stream of fluid only when said pressure level exists in said reservoir;
   a fluid valve adapted to turn on and off a flow of fluid from said reservoir to said spray nozzle;
   a first tube connected to said pump and said reservoir and adapted to convey said low volume flow of air from said pump into said reservoir to gradually pressurize said reservoir;
   a second tube connected to said reservoir and said fluid valve and adapted to convey pressurized fluid from said reservoir to said fluid valve; and
   a third tube connected to said fluid valve and said spray nozzle and adapted to convey pressurized fluid from said fluid valve to said spray nozzle.

2. The apparatus of claim 1 further comprising:
   an electric fan mounted on said cycling device, said fan being powered by said generator.

3. The apparatus of claim 2, wherein said fan is located in close proximity to said spray nozzle such that said stream of fluid is blown by the fan toward the rider when the fan is operated.

4. The apparatus of claim 3, further comprising:
   an electric switch disposed between said electric generator and said fan and adapted to control a flow of power from said electric generator to said fan.

5. The apparatus of claim 1, further comprising:
   a pressure valve coupled to said reservoir adapted to release air pressure in the reservoir at a predetermined level such that pressure within the reservoir is maintained at a constant level.

6. The apparatus of claim 1, wherein said electric generator further comprises:
   a generator friction wheel engagable with said rotating wheel of said cycling device,
   wherein said rotating wheel of said cycling device turns said generator friction wheel to generate electrical power for said electric pump.

7. The apparatus of claim 6, further comprising:
   an on/off mechanism adapted to control the flow of electric power from said electric generator to said electric pump.

8. The apparatus of claim 7, further comprising:
   an electric switch disposed between said electric generator and said electric pump and adapted to control the flow of electric power from said electric generator to said electric pump.

9. The apparatus of claim 8, further comprising:
   an electric fan mounted on said cycling device, said fan being powered by said generator;
   wherein said electric switch is further adapted to turn on and off the flow of electrical power from said generator to said electric fan.

10. The apparatus of claim 6, wherein said generator friction wheel is releasably engagable with said rotating wheel, further comprising:
    a mechanical device adapted to engage and disengage said pump friction wheel with said rotating wheel of said cycling device thereby turning on and off the flow of electric power to said electric pump.

11. A pressurized cycling water spraying apparatus adapted to be mounted on a bicycle having a frame, at least one driven wheel, a steering wheel, and a handlebar, comprising:
    a reservoir mounted on said frame and having an interior adapted to contain a fluid;
    an electric pump mounted on said frame and adapted to provide a low volume flow of air to said interior of said reservoir to gradually pressurize said interior of said reservoir to a pressure level sufficient to spray water from said reservoir;
    an electric generator mounted on said frame in close proximity to said steering wheel and adapted to covert rotational force of said steering wheel into electrical energy supplied to said electric pump;
    a spray nozzle adapted to be mounted on said handlebar and to provide a stream of fluid to a rider of said bicycle only when said pressure level exists in said reservoir;

means for controlling said stream of fluid from said spray nozzle;

a first tube connected to said pump and said reservoir and adapted to convey said low volume flow of air from said pump into said reservoir to gradually pressurize said reservoir;

second tube connected to said reservoir and said means for controlling and adapted to convey pressurized fluid from said reservoir to said means for controlling; and a third tube connected to said means for controlling and said spray nozzle and adapted to convey pressurized fluid from said means for controlling to said spray nozzle.

12. The apparatus of claim 11, wherein said means for controlling said stream of fluid from said spray nozzle comprises a fluid valve.

* * * * *